United States Patent
Xu et al.

(10) Patent No.: US 10,558,474 B2
(45) Date of Patent: Feb. 11, 2020

(54) MEDIA INFORMATION PROCESSING METHOD, MOBILE TERMINAL, AND STORAGE MEDIUM

(71) Applicant: TENCENT TECHNOLOGY (SHENZHEN) COMPANY LIMITED, Shenzhen (CN)

(72) Inventors: Gang Xu, Shenzhen (CN); Xianjun Wang, Shenzhen (CN); Xiaomin Yan, Shenzhen (CN); Dan Yang, Shenzhen (CN); Yi Xie, Shenzhen (CN); Feng Song, Shenzhen (CN); Lin Pei, Shenzhen (CN); Bin Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/926,399

(22) Filed: Mar. 20, 2018

(65) Prior Publication Data
US 2018/0210741 A1 Jul. 26, 2018

Related U.S. Application Data

(63) Continuation of application No. PCT/CN2016/112769, filed on Dec. 28, 2016.

(30) Foreign Application Priority Data

Jan. 12, 2016 (CN) .......................... 2016 1 0018414

(51) Int. Cl.
*G06F 9/451* (2018.01)
*G06F 16/438* (2019.01)
(Continued)

(52) U.S. Cl.
CPC ............ *G06F 9/451* (2018.02); *G06F 16/438* (2019.01); *G06F 16/972* (2019.01);
(Continued)

(58) Field of Classification Search
CPC .... G06F 16/438; G06F 9/451; G06Q 30/0241
See application file for complete search history.

(56) References Cited

U.S. PATENT DOCUMENTS

| | | | |
|---|---|---|---|
| 2003/0060897 A1 | 3/2003 | Matsuyama et al. | |
| 2005/0200907 A1* | 9/2005 | Kitayama ............. | G06Q 10/10 358/444 |

(Continued)

FOREIGN PATENT DOCUMENTS

| | | |
|---|---|---|
| CN | 102426685 A | 4/2012 |
| CN | 102521770 A | 6/2012 |

(Continued)

OTHER PUBLICATIONS

The State Intellectual Property Office of the People's Republic of China (SIPO) Office Action 1 for 201610018414.6 dated May 18, 2018 9 Pages (including translation).

(Continued)

*Primary Examiner* — Li P Sun
(74) *Attorney, Agent, or Firm* — Anova Law Group, PLLC

(57) ABSTRACT

The present disclosure discloses a media information processing method, a mobile terminal, and a storage medium. The method includes: determining that a condition for presenting media information in a graphical interface of an application is satisfied; requesting media information and a control policy of the media information from a server; loading the control policy in the application, and determining that a form needs to be used in the media information to obtain information from a user; requesting a WebView page (Continued)

adapted to the form from the server, the WebView page being obtained by initializing a WebView template based on a customized parameter of the form; and presenting the media information in the graphical interface of the application, and loading the WebView page in the graphical interface of the application.

20 Claims, 12 Drawing Sheets

(51) Int. Cl.
    *G06Q 30/02*         (2012.01)
    *G06F 16/958*       (2019.01)
    *G06F 17/22*         (2006.01)
    *G06F 17/24*         (2006.01)

(52) U.S. Cl.
    CPC ........ *G06F 17/2247* (2013.01); *G06F 17/248* (2013.01); *G06Q 30/0241* (2013.01)

(56) References Cited

U.S. PATENT DOCUMENTS

| | | | |
|---|---|---|---|
| 2009/0037253 A1* | 2/2009 | Davidow | G06Q 30/02 705/7.32 |
| 2009/0055725 A1 | 2/2009 | Portnov et al. | |
| 2009/0287683 A1* | 11/2009 | Bennett | G06F 16/9535 |
| 2010/0121730 A1* | 5/2010 | Roden | G06Q 30/06 705/26.1 |
| 2011/0252346 A1* | 10/2011 | Chaudhri | G06F 3/04817 715/765 |
| 2014/0007155 A1* | 1/2014 | Vemparala | G06Q 30/0251 725/32 |
| 2015/0310098 A1 | 10/2015 | Chudnovskiy | |
| 2015/0360131 A1* | 12/2015 | Tsuchida | A63F 13/79 463/29 |

FOREIGN PATENT DOCUMENTS

| | | |
|---|---|---|
| CN | 103606094 A | 2/2014 |
| CN | 103885764 A | 6/2014 |
| CN | 104350518 A | 2/2015 |
| CN | 105120054 A | 12/2015 |
| CN | 105677357 A | 6/2016 |

OTHER PUBLICATIONS

The World Intellectual Property Organization (WIPO) International Search Report for PCT/CN2016/112769 dated Mar. 29, 2017 6 Pages (including translation).

* cited by examiner

MEDIA INFORMATION PROCESSING METHOD, MOBILE TERMINAL, AND STORAGE MEDIUM

RELATED APPLICATION

This application claims priority to PCT Application No. PCT/CN2016/112769, filed on Dec. 28, 2016 which claims priority to Chinese Patent Application No. 2016100184146, entitled "MEDIA INFORMATION PROCESSING METHOD, MOBILE TERMINAL, AND STORAGE MEDIUM", filed on Jan. 12, 2016. Both applications are incorporated by reference in their entirety.

FIELD OF THE TECHNOLOGY

The present disclosure relates to Internet communications technologies, and in particular, to a media information processing method, a mobile terminal, and related storage medium.

BACKGROUND OF THE DISCLOSURE

A mobile terminal, such as a smartphone, or a tablet computer, is a terminal currently widely used to access the Internet. The rapid development of mobile communications makes it possible for a mobile terminal device to rapidly access the Internet. For example, currently, a user can access the Internet by using a fourth-generation mobile communications (4G) protocol or a wireless compatibility certification (e.g., Wi-Fi) protocol.

When a user accesses the Internet by using a browser, or playing back an Internet video by using a client application, such as a video client, a media information provider, such as an advertiser or a news issuer, may demand to push media information to a mobile terminal, and a server may present the media information for the media information provider by using a graphical interface of an application in the mobile terminal.

A graphical interface of an application at a PC side presents advertisements in different ways. However, currently, a graphical interface of an application of a mobile terminal only supports loading of single form media information, such as an image or a video, and does not support interactive operations. That is, an interactive operation with a user is not supported in a process of presenting the media information in the graphical interface of the application. One push of the media information is completed after the media information is loaded.

SUMMARY

Embodiments of the present disclosure provide a media information processing method, a mobile terminal, and a storage medium, being capable of efficiently achieving a form-supporting page in a graphical interface, of a mobile terminal, that presents media information.

The technical solutions of the embodiments of the present disclosure are implemented as follows.

According to a first aspect, an embodiment of the present disclosure provides a media information processing method, including: determining that a condition for presenting media information in a graphical interface of an application is satisfied; requesting media information and a control policy of the media information from a server; loading the control policy in the application, and determining that a form needs to be used in the media information to obtain information from a user; requesting a WebView page adapted to the form from the server, the WebView page being obtained by initializing a WebView template based on a customized parameter of the form; and presenting the media information in the graphical interface of the application, and loading the WebView page in the graphical interface of the application.

According to a second aspect, an embodiment of the present disclosure provides a terminal, including: a detection unit, configured to detect that a condition for presenting media information in a graphical interface of an application is satisfied, and request media information and a control policy of the media information from a server; a control unit, configured to load the control policy in the application, and determine, by executing the control policy, that a form needs to be used in the media information to obtain information from a user of the mobile terminal, and configured to request a WebView page adapted to the form from the server side, the WebView page being obtained by the server side by initializing a WebView template based on a customized parameter of the form; and a loading unit, configured to present the media information in the graphical interface of the application, and load the WebView page in the graphical interface of the application.

According to another aspect, an embodiment of the present disclosure provides a storage medium, the storage medium storing an executable instruction, and the executable instruction being used to perform the media information processing method provided in the embodiments of the present disclosure.

In the embodiments of the present disclosure, in a graphical interface, of an application, that presents media information, a control policy for presenting the media information is generated by loading the control policy in the application, and a WebView page adapted to the media information is obtained by executing the control policy. After rendering the WebView page, a presentation of the media information and a form together can be presented to a user. At the same time, by an interaction between a form control and the user of a mobile terminal, information input in the form by the user of the mobile terminal can be obtained. The foregoing operations are completed by using the control policy loaded in the application, which does not need to be changed according to different scenarios and multiple technical interfaces of the mobile terminal, and has high developing efficiency. In addition, the WebView pages can be generated in advance according to requirements of different media information providers, and an adapted WebView page can be immediately loaded after received a request, which does not need additional processing of adapting to the technical interfaces of the mobile terminal, thereby ensuring efficiency of pushing the media information to the mobile terminal and obtaining information from the user of the mobile terminal.

DESCRIPTION OF EMBODIMENTS

Figure 1A:
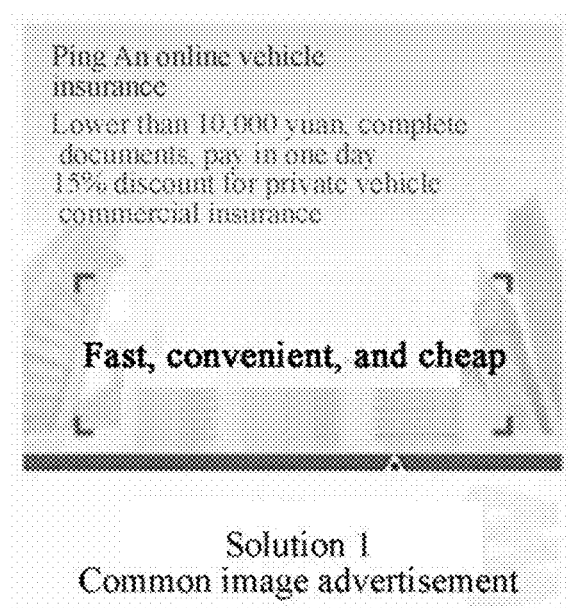
FIG. 1*a* and FIG. 1*b* are each a schematic diagram of a graphical interface of an application at a PC side presenting an advertisement in different manners.

The following further describes the present disclosure in detail with reference to the accompanying drawings and embodiments. It should be understood that the specific embodiments described herein are merely used to explain the present disclosure but are not intended to limit the present disclosure. In addition, the embodiments provided below are some of the embodiments for implementing the present disclosure, rather than all of the embodiments for implementing the present disclosure. Embodiments obtained by a person skilled in the art by recombining technical solutions of the following embodiments without creative efforts, and other embodiments implemented based on the present disclosure shall fall within the protection scope of the present disclosure.

It should be noted that the terms "include", "comprise", or any other variation thereof in the embodiments of the present disclosure are intended to cover a non-exclusive inclusion. Therefore, a method or a device that includes a series of elements not only includes elements clearly recorded therein, but also includes other elements not specified clearly, or also includes inherent elements of the method or the device. Without more limitations, an element limited by "include a/an . . . " does not exclude other related elements (for example, steps in the method, or units in the device) existing in the method or the device that includes the element.

For example, a media information processing method provided in the embodiments of the present disclosure includes a series of elements, but the media information processing method provided in the embodiments of the present disclosure is not limited to the recorded steps. Similarly, a video processing apparatus provided in the embodiments of the present disclosure includes a series of units, but the video processing apparatus provided in the embodiments of the present disclosure is not limited to include the units clearly recorded therein, may also include units needing to be disposed for obtaining related information or performing processing based on information.

Before the present disclosure is further described in detail, various terms involved in the embodiments of the present disclosure are described. A mobile terminal in the present disclosure may refer to a device such as a smartphone, a tablet computer, or a vehicle terminal, which supports installation of various clients (for example, a client providing various network-based services) and displays graphical interfaces of the clients. A form control in the present disclosure may include an object in an interface of a mobile terminal, completes a display of an interface element, such as a window, a text box, a button, or a drop-down menu, responds to related operations received in the interface, and can be widely applied to displays and operations of various clients.

The type of the form control may include: a drop-down type form control, which presents, by dropping down a form, candidate form information for a user to select; and an input type form control, which presents, by using a table, different types of form items and corresponding input boxes (where form information is input into the input boxes).

Figure 1B:
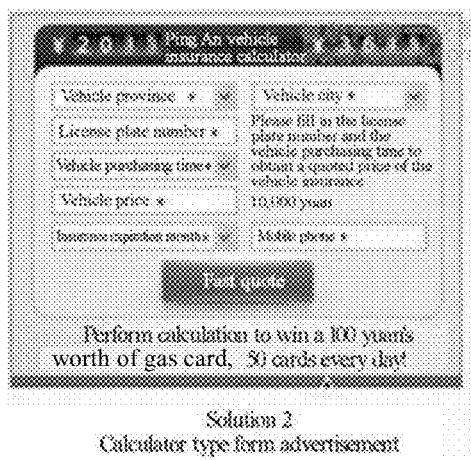

An example of presenting an advertisement in a graphical interface of an application at a PC side in different manners is shown in FIG. 1a and FIG. 1b. For an advertiser, a form advertisement shown in FIG. 1b obtains information of a user by using a form when propagating information, and, in comparison with an advertisement in FIG. 1a that only propagates information, can better satisfy requirements of some industries (for example, an insurance industry, a vehicle test driving industry, and an education and training industry) for information posting of main contents of an official website, thereby developing more new customers. The form advertisement has a high cost performance and a high return on investment (ROI), reduces costs of pushing the advertisement of the advertiser, and shortens a circle of pushing the advertisement. Data show that the conversion rate, i.e. conversion of click-throughs of an advertisement to times of effective consumption, of the form advertisement is twice of that of a common advertisement.

However, a graphical interface of an application on a mobile terminal often only supports loading of single form media information such as an image, or a video, and does not support a form type interactive operation. That is, only the common advertisement in the form shown in FIG. 1a can be implemented, that is, the interactive operation with the user may not supported in a process of presenting the media information in the graphical interface of the application, and one push of the media information is completed after the media information is loaded. At least the following problems exist:

If the media information provider has a requirement for obtaining information from the user of the mobile terminal, when the graphical interface of the application of the mobile terminal presents the media information, a form needs to be presented in the graphical interface at the same time to interact with the user. The user may fill and upload the form, thereby achieving an objective of obtaining information from the user based on the form. However, creating a page configured to support a form on the mobile terminal differs from creating that on a desktop computer. User interfaces of a mobile terminal need to adapt to different scenarios and multiple technical interfaces of the mobile terminal, and the developing costs may be high.

Figure 2:
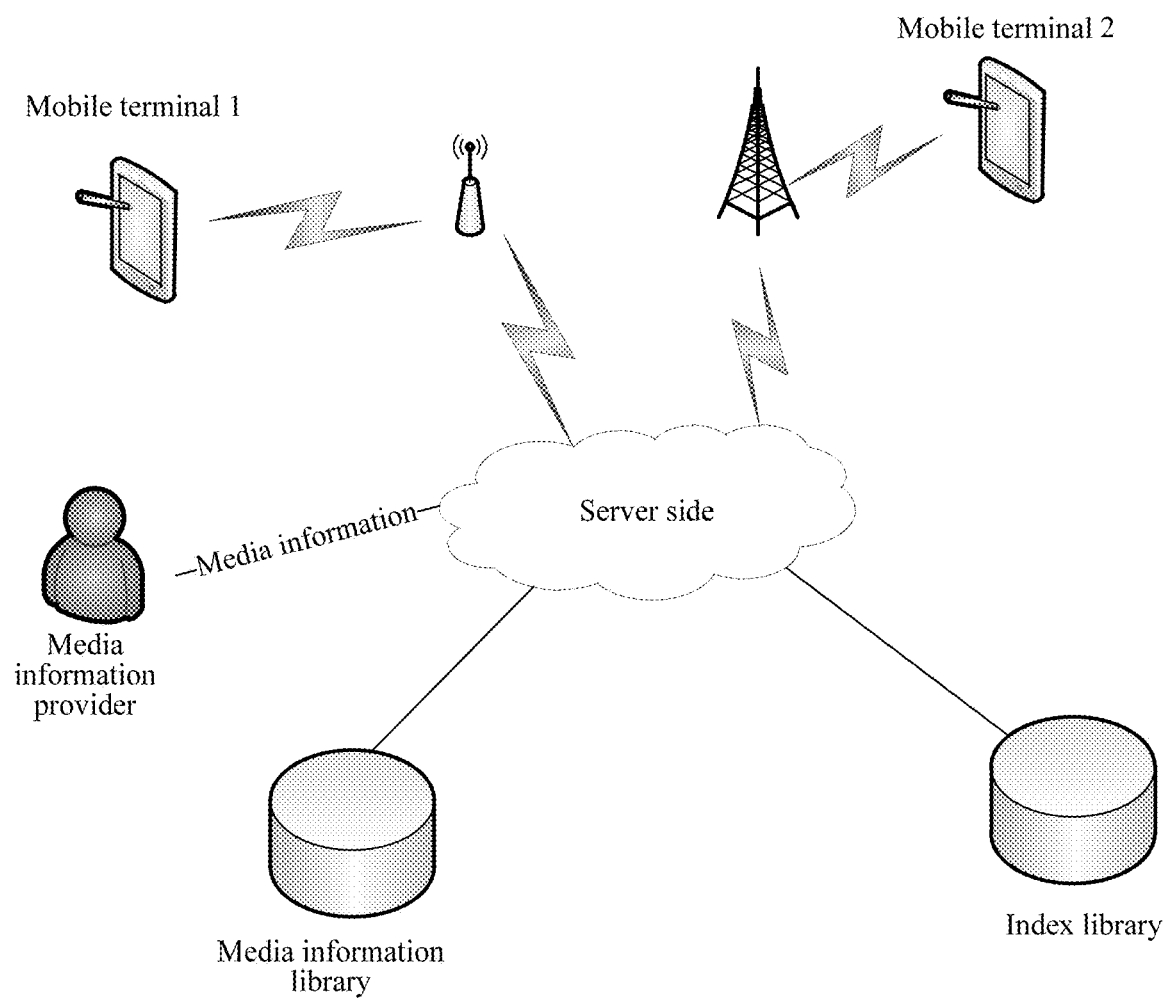
FIG. 2 is a schematic diagram of an optional application scenario in which a server pushes media information to a mobile terminal in an embodiment of the present disclosure.

FIG. 2 exemplarily shows a schematic diagram of an optional application scenario in which a server pushes media information (for example, advertisements or news) to a mobile terminal in an embodiment of the present disclosure. In FIG. 2, an example in which the mobile terminal is a mobile phone is used. Certainly, the mobile terminal may alternatively be a tablet computer or other mobile terminals, or may be a portable, pocket, handheld, computer built-in or vehicle-mounted mobile apparatus. The mobile terminal can execute radio access network switched data under various communications networks. Typically, the communications networks may be a Global System for Mobile communications (GSM) network, a Code Division Multiple Access (CDMA) network, a Wideband Code Division Multiple Access (WCDMA) network, a Long Term Evolution (LTE) communications network, and the like.

Typically, a mobile terminal 1 may communicate with the server by using a Wi-Fi method, a mobile terminal 2 may communicate with the server side by using a cellular communications method, and databases (including an index library and a media information library) shown in FIG. 2 may connect to and communicate with the server side by using an optical cable, an electrical cable, or a network cable. It should be noted that, the media information library and the index library shown in FIG. 2 may be implemented as databases independent of each other, or the two databases may be combined and implemented as one database according to needs.

A media information provider may have a requirement for pushing the media information to the mobile terminal. The server may support the media information uploaded to the media information library by the media information provider (when uploading the media information to the server, the media information provider may set a targeting condition of the media information, the targeting condition includes different dimensions such as a user area, an age, a preference, and a mobile terminal type, and the targeting condition set for the media information is classified in the index library by using an indexing method) to be pushed to a user of a mobile terminal expected by the media information provider (that is, a mobile terminal meets the targeting condition).

The specific embodiments of the present disclosure are provided based on the mobile terminal and the server side recorded above.

Figure 3:
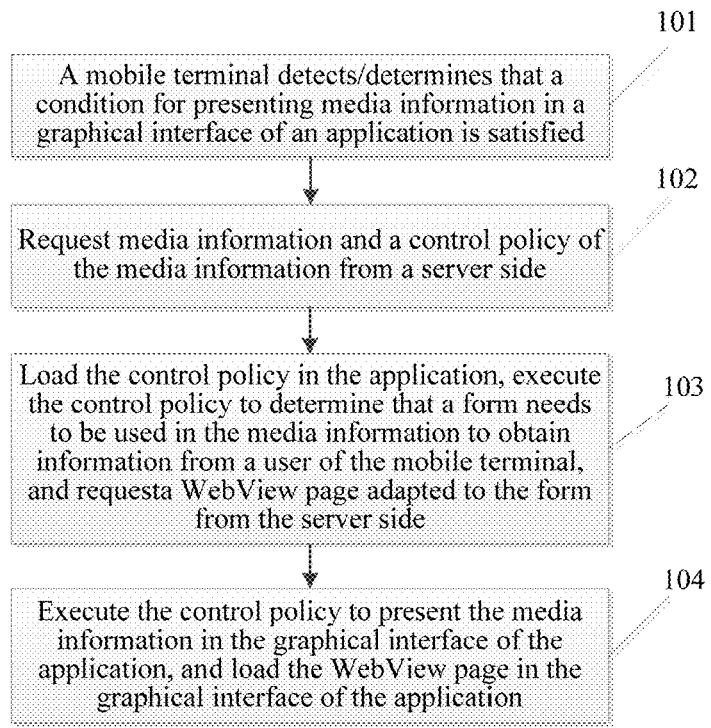
FIG. 3 is schematic flowchart 1 of a media information processing method in an embodiment of the present disclosure.

A media information processing method consistent with an embodiment of the present disclosure is applied to the foregoing mobile terminal. Referring to FIG. 3, the media information processing method recorded in this embodiment of the present disclosure may include the following steps.

Step S101: A mobile terminal may detect that a condition for presenting media information in a graphical interface of an application is satisfied. The mobile terminal may run any type of application (for example, a network video application, a network audio application, or a network browser), present the graphical interface of the application in a display of the mobile terminal (where the graphical interface may present information related to an application service, for example, a video or an audio), and determine, based on a media information pushing logic built in the application, whether the condition for presenting the media information in the graphical interface of the application is satisfied.

The condition herein may use at least one of the following: the mobile terminal starts the application and presents the graphical interface of the application in the display; the mobile terminal switches from another graphical interface to display the graphical interface of the application; or the mobile terminal presenting the information related to the application service in the graphical interface of the application reaches a preset rate of progress. For example, a video playback application may play back a video, or an audio playback application playing back an audio to the 50% point.

The conditions described above are merely examples. During actual implementation, the condition may alternatively be that a periodic or random time arrives in processes of running the application and presenting the graphical interface of the application.

Step S102: The mobile terminal may request media information and a control policy of the media information from a server.

The mobile terminal may request the media information from the server side by sending a media information request. Optionally, the media information request may carry characteristic information of the mobile terminal, and the characteristic information includes at least one of the following: an operating system type, a networking method, a type of an operator of a used communications service, a networking scenario, or an application behavior; The network scenario may be a public space, a home, a company, or a school, etc. The application behavior may be running a game application, or running a non-game application, etc.

Optionally, the media information request may carry characteristic information of a user of the mobile terminal, and the characteristic information includes at least one of the following: a region, a gender, an age group, an education degree, or an interest and preference.

If the media information request sent by the mobile terminal does not carry the characteristic information described above, the server side randomly sends the media information to the mobile terminal. If the media information request carries the characteristic information, the server side matches the characteristic information with a targeting condition in an index library, determines matched media information and saves the matched media information into a media information queue, and responds to the media information request of the mobile terminal by using the media information in the media information queue.

The control policy of the media information may be used to generate presentation logic of the media information in the graphical interface of the application, which may be achieved by using a software development kit (SDK) method during actual implementation.

Step S103: The mobile terminal may load the control policy in the application, executes the control policy to determine that a form needs to be used in the media information to obtain information from a user of the mobile terminal, and request a WebView page adapted to the form from the server side.

The application run by the mobile terminal may execute a processing logic in the control policy by loading the control policy, and request the server side to determine, when the media information is presented in the graphical interface of the application, whether the form still needs to be used in the graphical interface of the application to obtain information input in the form by the user, such as determine whether the media information has an attribute of using a form to obtain information, that is, determine whether a type of the media information is media information using a form, and when the media information is an advertisement, determine that the media information is a form advertisement.

When uploading, at the server side, the media information may need to be pushed, if the media information provider requires the mobile terminal to present, when presenting the media information in the graphical interface of the application, the form in the media information at the same time for the user of the mobile terminal to input information in the form, thereby achieving an objective of obtaining information from the user of the mobile terminal, that is, the media information provider needs to push form type media information, the server side supports the user setting a customized parameter of the form. The customized parameter indicates the following information: bootstrap action description information; a type of a form item in the form (or a form item in the form and a type thereof, and different candidate items of the form item of this type) and a quantity of the form item in the form; and a type and quantity of a form control required by the form.

The bootstrap action description information may be used to describe a service purpose of the form to the user of the mobile terminal, for example, applying and obtaining for free, immediate test driving, experiencing for free, or surprise-giving interaction.

The type of the form control may include a drop-down type form control and an input type form control. The drop-down type form control presents, by dropping down a form, candidate form information for the user to select. The input type form control may present, by using a table, different types of form items and corresponding input boxes (a quantity of the input boxes is same as a quantity of the types of the form items corresponding to the input type form control) for the user of the mobile terminal to input form information corresponding to different types of form items into the input boxes.

The type of the form items is determined by a type of information that the media information provider expects to obtain.

For example, when the media information provider is a credit card issuer, the media information provider correspondingly sets, according to a type of information that needs to be obtained from the user of the mobile terminal, a corresponding type of the form item, and sets, according to needs of the media information provider, a quantity of form controls to be used when each type of the form item is presented, that is, uses the input type form control to present the form item or uses the drop-down type form control to present the form item.

An optional example of the different types of the form items may be a name, a phone number, or an expected application limit (where different limit candidates may also be set for the form item of the application limit, for example, ten thousand, or twenty thousand). Optionally, the media information provider specifies to use the input type form control to present the foregoing form items and corresponding input boxes by using a table for the user to input the name, the phone number, and the expected application limit in the input boxes. The input type form control detects the information input by the user. Optionally, the input type form control may cooperate with the drop-down type form control to present the foregoing types of the form items. For example, the media information provider may also use the input type form control to present the form items of the name and the phone number, and use the drop-down type form control to present the different candidates of the foregoing application limit for the user of the mobile terminal to select, and detect a limit selected by the user.

During actual implementation, the server side also may support the media information provider setting form parameters related to the following services: a test driving industry: pushing an advertisement by using rapidly signing up for test driving in coordination with a vehicle roll; an education industry: rapidly signing up for a trial lass of an education institution; a financial industry: applying for a vehicle insurance; and a cosmetics industry: submitting personal information to apply for a cosmetics sample.

The server may initialize a WebView template based on the customized parameter (including the bootstrap action description information, and the type and the quantity of the form item in the form) set by the media information provider for the media information that is expected to be pushed, to obtain a WebView page. Taking into account diversification of the customized parameter set by the media information provider (for example, a same media information provider may upload multiple pieces of media information to the server side, and set different customized parameters for each piece of media information), the server side correspondingly generates a large quantity of WebView pages. To improve the delivery efficiency, the server side may store the WebView pages on a content delivery network (CDN), and based on the CDN, respond to a request of the mobile terminal for a WebView page adapted to the form.

In one example, the media information is an advertisement. After the mobile terminal requests and obtains the advertisement from the server side, the application run by the mobile terminal determines, by loading an advertisement SDK (including the control policy), whether the requested advertisement is the form advertisement (that is, an advertisement needing to present, during playback, the form in the advertisement to obtain information input in the form by the user); if the requested advertisement is the form advertisement, requests, from the server side, a WebView page adapted to the advertisement requested and obtained by the mobile terminal, that is, the WebView page generated by the server side based on the customized parameter set by the media information provider for the advertisement requested and obtained by the mobile terminal; and if the requested advertisement is not the form advertisement, shows that the advertisement requested and obtained by the mobile terminal is a common advertisement (which does not need to present the form in the advertisement to obtain the information input in the form by the user), and directly presents the advertisement in the graphical interface of the application.

Step S104: The mobile terminal may execute the control policy to present the media information in the graphical interface of the application, and loads the WebView page in the graphical interface of the application.

An example in which the loading is merely completing data preparation (for example, reading related data into a cache) for rendering and presentation of the WebView page is used for description in this embodiment of the present disclosure. A visual effect of superimposing a presentation area of the WebView page on a presentation area of the media information can be achieved. For example, a first area of the graphical interface of the application presents the media information, and the WebView page is loaded in a second area of the graphical interface of the application. If the second area is a sub-area of the first area, when the loaded WebView page is rendered, the form carried in the WebView page is presented above the media information in a floating layer (transparency of the floating layer is set according to requirements) manner.

A visual effect of separately displaying the presentation area of the WebView page and the presentation area of the media information (that is, displaying the presentation area of the WebView page and the presentation area of the media information in different areas of the graphical interface of application) can be achieved. For example, the first area of the graphical interface of the application presents the media information, and the WebView page is loaded in the second area of the graphical interface of the application. If the second area and the first area are different areas in the graphical interface of application, when the loaded WebView page is rendered, the form carried in the WebView page and the media information are displayed in the different areas of the graphical interface.

In this embodiment of the present disclosure, in the graphical interface of the application that presents the media information, the control policy for presenting the media information is achieved by loading the control policy in the application, and the WebView page adapted to the media information is obtained by executing the control policy. After rendering the WebView page, an effect of presenting the media information and the form together can be achieved. At the same time, by the interaction between the form control and the user of the mobile terminal, the information input in the form by the user of the mobile terminal is obtained. The foregoing operations are completed by using the loaded control policy in the application, which does not need to consider adaptation to different scenarios and multiple technical interfaces of the mobile terminal, and has high developing efficiency. In addition, the WebView pages can be generated in advance according to requirements of different media information providers, and an adapted WebView page can be immediately loaded after being requested, which does not need additional processing of adapting to the technical interfaces of the mobile terminal, thereby ensuring efficiency of pushing the media information to the mobile terminal and obtaining information from the user of the mobile terminal.

A distinctive feature of the mobile terminal is that a screen area of the mobile terminal is evidently smaller than that of a fixed terminal (for example, a display of a desktop computer). When the mobile terminal loads the form and performs rendering presentation, a relatively small operational area of the form will increase a degree of operational difficulty, and affect user experience.

In this embodiment of the present disclosure, the processing of the mobile terminal loading the WebView page in the graphical interface of the application is described. In this embodiment of the present disclosure, not only the data preparation for the rendering presentation is completed, but also contents are presented according to operations implemented by the user, to achieve the interaction with the user.

Figure 4:
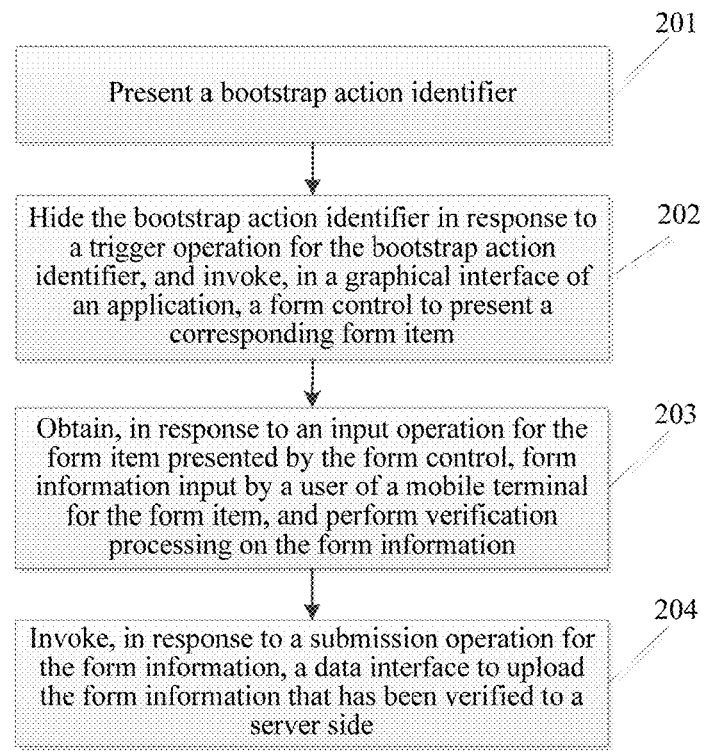
FIG. 4 is schematic flowchart 2 of a media information processing method in an embodiment of the present disclosure.

Referring to FIG. 4, the processing of loading the WebView page on the mobile terminal includes the following steps.

Step S201: Present a bootstrap action identifier.

As described above, if the second area used for loading the WebView page is the sub-area of the first area used for presenting the media information, the bootstrap action identifier may be presented above the media information in the floating layer manner. The bootstrap action identifier may be used to describe the service purpose of the form to the user of the mobile terminal. If wanting to submit the form, the user may perform a trigger operation (for example, clicking) on the bootstrap action identifier Step S202: Hide the bootstrap action identifier in response to a trigger operation for the bootstrap action identifier, and invoke, in the graphical interface of the application, a form control to present a corresponding form item.

A display effect, such as a color, or transparency, of the floating layer may be controlled in the graphical interface of the application by using a preset display parameter. A preset quantity of form items in the form items corresponding to the form control are presented in the floating layer. The form items are presented in batches according to the preset quantity. For example, three or less form items are presented each time invoking the form control, to avoid a problem of being difficult to operate caused by an excessively small operational area due to presenting excessive form items.

When the drop-down type form control is loaded, the candidate form information of the form items is presented in the floating layer by dropping down the form for a user to select. When the input type form control is loaded, different types of form items and corresponding input boxes (a quantity of the input boxes is same as a quantity of the types of the form items) are presented by using a table for the user of the mobile terminal to input form information corresponding to different types of form items into the input boxes.

Step S203: Obtain, in response to an input operation for the form item presented by the form control, form information input by a user of the mobile terminal for the form item, and perform verification processing on the form information.

The drop-down type form control may present, in the floating layer by dropping down the form, candidate form information of the form items for the user to select. The user triggering form information that needs to be selected will be detected by the drop-down type form control. The input type form control presents, by using a table, different types of form items and corresponding input boxes. The user of the mobile terminal inputting, in the input boxes, form information corresponding to the different types of form items will be detected by the input type form control.

To help the user understand a current operation status for the form items, optionally, an operation of the user for the corresponding form item presented by the form control may be parsed, and a target form item of the operation and an operation status of the target form item may be determined. The operation status may include: a no operation state, an input state, an input complete state, and an input error state. A display effect of an icon of the target form item may be updated based on the operation status of the target form item. For example, a color of the icon of the target form item is changed, or graphical elements (for example, a tick represents completed and correct input, a blinking cursor represents ongoing input) corresponding to different operation states are added and displayed in the icon of the target form item to prompt user of the operation status for the target form item.

Step S204: Invoke, in response to a submission operation for the form information, a data interface to upload the form information that has been verified to the server.

Taking into account that an error may exist in the information input by the user, for example, the input phone number may be short of a digit, to avoid obtaining invalid or incorrect information from the user, the information input by the user may be verified based on information verification rules of different form items. After the information input is determined to be valid, a local data interface of the mobile terminal may be invoked to upload the information input by the user to the server side. The server side classifies information submitted by different users for a same form for the media information provider to query and use.

In addition, to ensure continuity of experience of the user viewing the media information, the mobile terminal stops presenting the media information in the graphical interface of the application when detecting the trigger operation implemented by the user for the bootstrap action identifier; and resumes presenting the media information after the user completes the input operation for the form items presented by the form controls and submits the form information.

In this embodiment of the present disclosure, the bootstrap action identifier may be used to guide the user to determine whether he needs to fill in the form, thereby avoiding disturbance to the user due to immediately presenting the form. The form items corresponding to the form controls are presented in batches by batch presentation based on the preset quantity, thereby avoiding a problem of being difficult to operate by the user due to presenting all the form items at one time. At the same time, the user is prompted of the operation status for the form item, to help the user to understand the current operation state (for example, whether the input is incorrect).

This embodiment of the present disclosure is further described by using the following scenario as an example: that the media information is an advertisement, the media information provider is an advertiser, and the advertiser expects to push a form advertisement to the mobile terminal, that is, a video playback application presents a form during playing back the advertisement, to collect information input in the form by the user.

Figure 5:
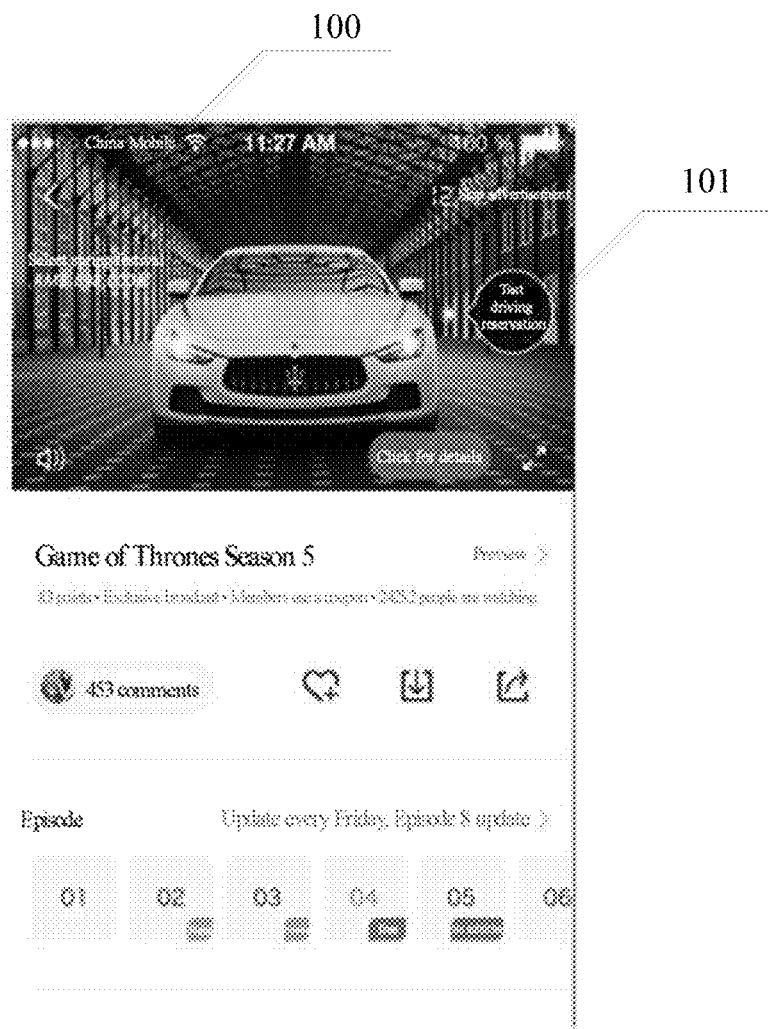
FIG. 5 is a schematic display diagram of playing back an advertisement and loading a floating layer in an embodiment of the present disclosure.

The video application may request the advertisement and an advertisement SDK from the server side before playing back an online video, and implement, by executing control logic of the advertisement SDK, subsequent processing of playing back the advertisement and presenting the form. Referring to FIG. 5, the video application may play back the advertisement in a playback window 100 by using a roll, and loads a floating layer in a right area of the video playback window. The floating layer may present a bootstrap action identifier 101 of "test driving reservation" to prompt the user to click and fill in the form.

A text of the bootstrap action identifier 101 may be set by the advertiser at a server background, and can be set as: applying and obtaining for free, immediate test driving, experiencing for free, or surprise-giving interaction according to needs.

Figure 6:
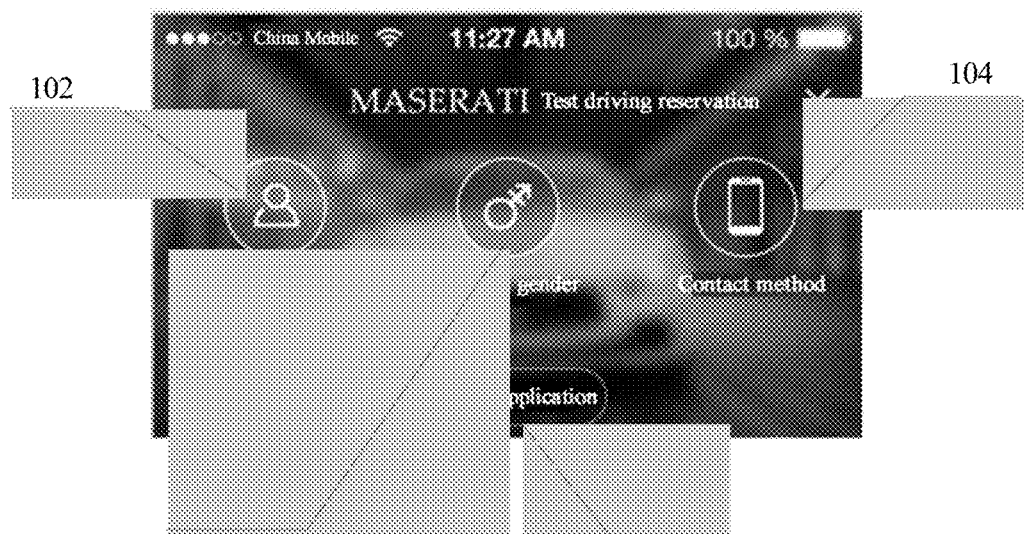
FIG. 6 is a schematic diagram of presenting form items in an embodiment of the present disclosure.

When the user clicks the bootstrap action identifier 101 of "test driving reservation", the video application may hide the bootstrap action identifier 101 of "test driving reservation", and pops up a form filling-in floating layer shown in FIG. 6. FIG. 6 shows three form items: an inputting name form item 102, a selecting gender form item 103, and a contact method form item 104. A quantity of the form items that can be presented at one time in the floating layer may be determined by the advertiser or a server-side developer at the server-side background.

The user may select the form items and fills in the form information. After being submitted by using a submission application 105, the form information is saved to the server side background by the advertisement SDK in the video application by using a background interface.

To ensure the continuity of the user viewing the advertisement, the advertisement SDK may suspends the playback of the advertisement after loading the floating layer in the playback window of the video application, and continue to play back the advertisement after the form information is successfully submitted and loading of the floating layer is stopped.

Figure 7A:
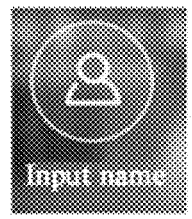
FIG. 7a to FIG. 7d are each a schematic format diagram of a form item under different states in an embodiment of the present disclosure.

Different icons may be set correspondingly for each form item to indicate a different state. There are four states in default: an icon of a default state shown in FIG. 7a, an icon of clicking (an input state) shown in FIG. 7b, an icon of an input completion state shown in FIG. 7c, and an icon of prompting an input error shown in FIG. 7d. As an example, FIG. 8 shows icons of different types (for example, select academic degree, province and city, geographical position, and user-define). The icons are set by combining texts and images, or by using one of the texts and images.

Figure 7B:
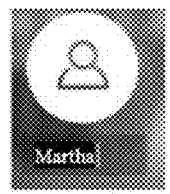
Figure 7C:
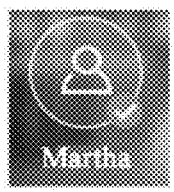
Figure 7D:
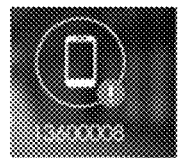
Figure 8:
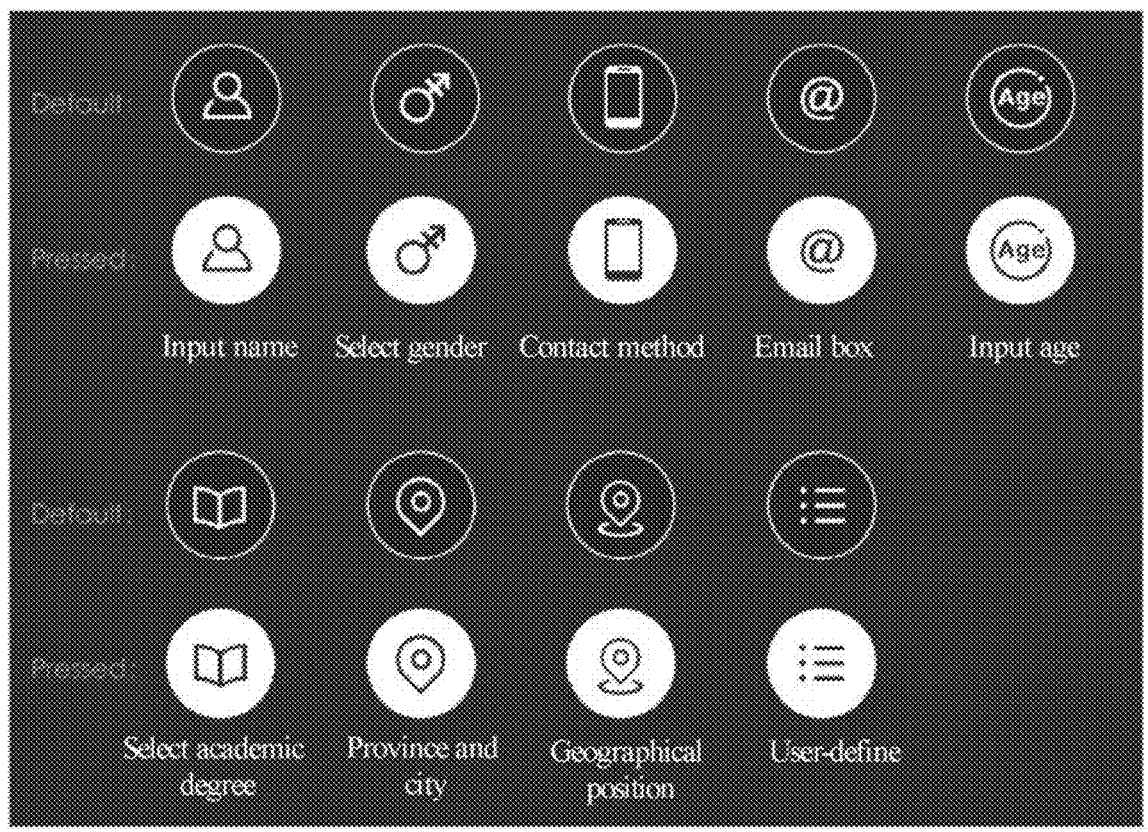
FIG. 8 is a schematic diagram of form item icons in an embodiment of the present disclosure.
Figure 9:
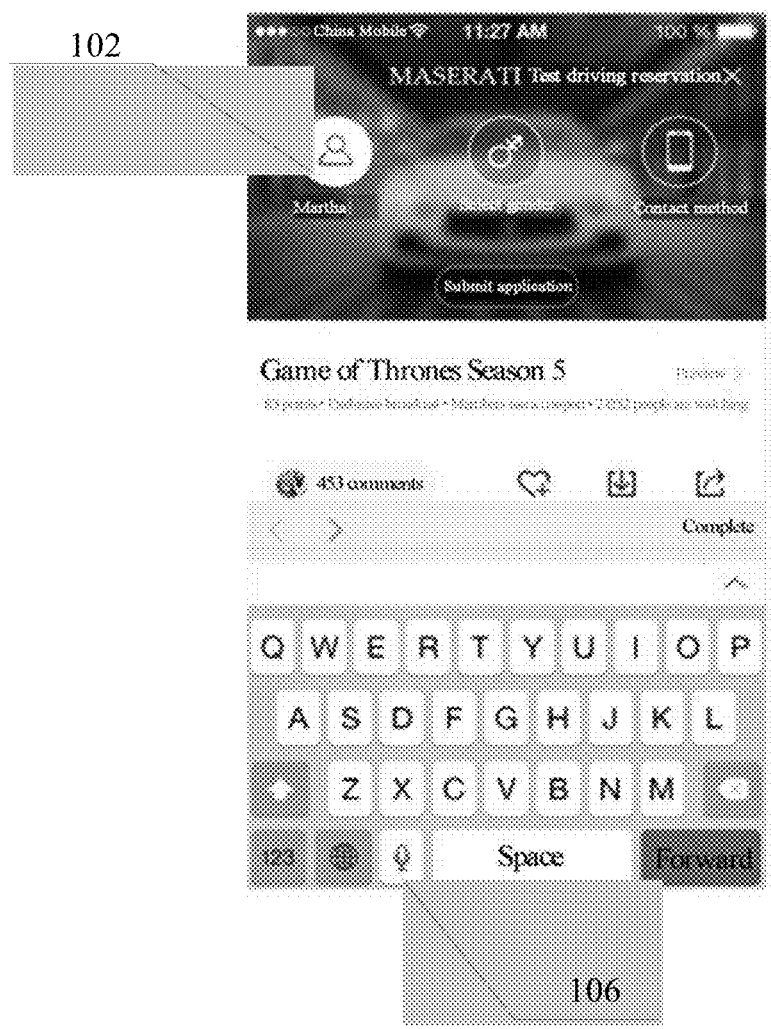
FIG. 9 is a schematic diagram of invoking an input interface in an embodiment of the present disclosure.
Figure 10:
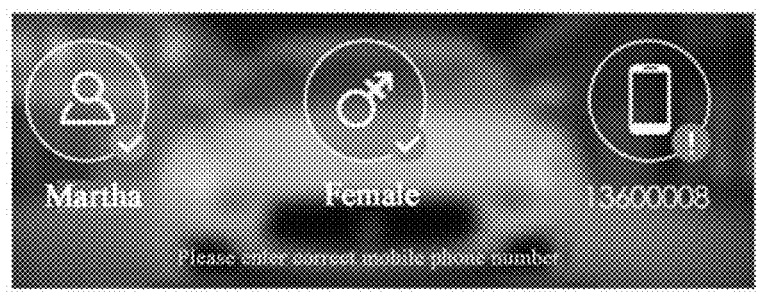
FIG. 10 is a schematic diagram of prompting an input error of form information in an embodiment of the present disclosure.

Referring to FIG. 9, when the user clicks the inputting name form item 102, the inputting name form item 102 may be switched to a format indicating the input state shown in FIG. 7b. An input interface 106 of the mobile terminal may be invoked for the user to input, and after the form information is input, the filled form information is verified. FIG. 10 shows a prompt interface when form information of the contact method form item 104 is incorrect, which used to prompt the user to input the form information again.

Figure 11:
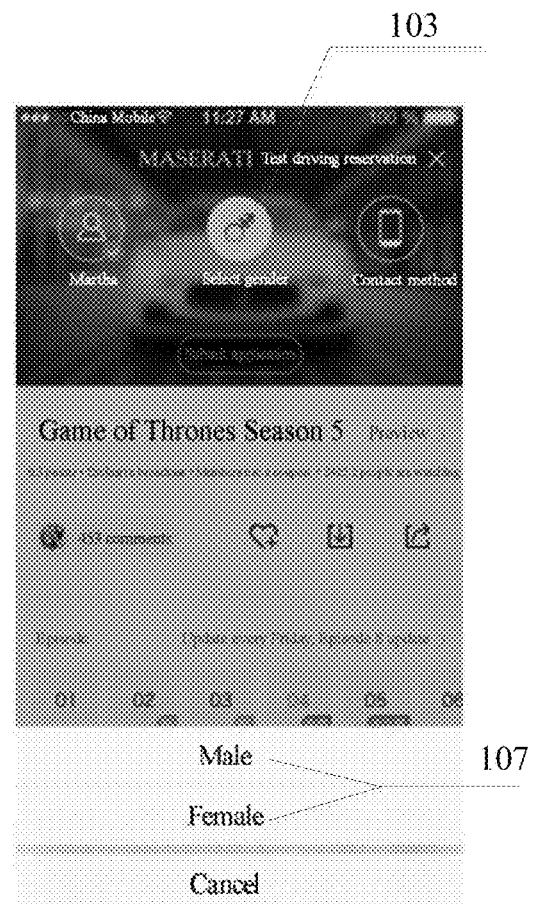
FIG. 11 is a schematic diagram of presenting candidate form information for a user to select in an embodiment of the present disclosure.

Referring to FIG. 11, the selecting gender form item 103 is presented in the floating layer by the drop-down type form control. The drop-down type form control presents candidate form information (male/female) for the user to select.

Figure 12:
FIG. 12 is a schematic diagram of prompting that form information input is verified to be correct in an embodiment of the present disclosure.
Figure 13:
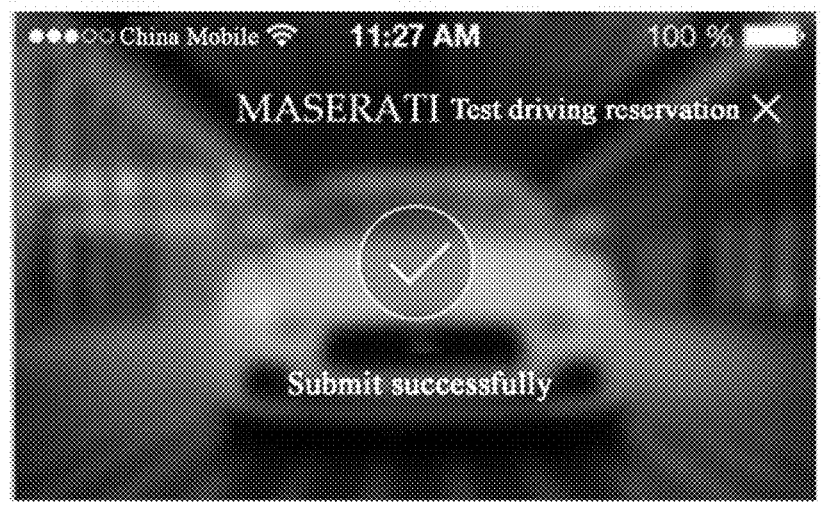
FIG. 13 is a schematic diagram of successfully submitting form information input in an embodiment of the present disclosure.

Referring to FIG. 12, after the user has input form information for the inputting name form item 102, the selecting gender form item 103, and the contact method form item 104, and the verification is completed, the inputting name form item 102, the selecting gender form item 103, and the contact method form item 104 may be switched to formats prompting correct input, and detailed information including activity rules, descriptions, and exoneration clauses are presented for the user to ascertain. The user may click the activity rules to view detailed rules. After the form is successfully submitted, a prompt of successful submission shown in FIG. 13 is presented, and the advertisement is continued to be played back.

The form information is submitted to the server side to be stored by using the data interface provided by the server side background, and is submitted to the advertiser at regular intervals.

Figure 14:
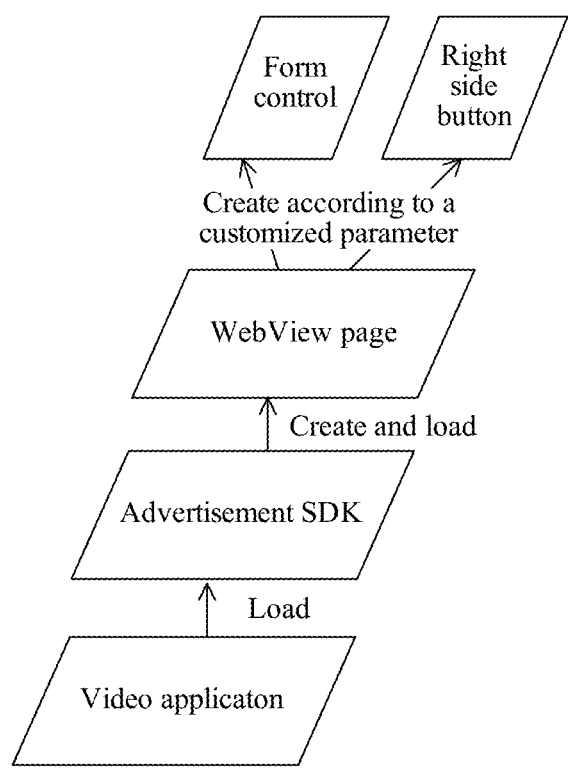
FIG. 14 is a schematic structural diagram of achieving a form advertisement in a video application in an embodiment of the present disclosure.

The form presented in the graphical interface of the video application of the mobile terminal is achieved by HTML5+ JS+CSS3 and other front-end technologies. Referring to FIG. 14, the most bottom layer is the video application, and the video application invokes the advertisement SDK to achieve playback logic of the advertisement. The advertisement SDK loads the WebView page in the graphical interface of the application, and functions such as a right side button (the bootstrap action identifier), an animation effect, a form control, and user interaction are achieved in the WebView page.

A basic process of presenting a mobile terminal-defined form roll advertisement includes the following steps.

First, the user may install and open a video application by using a PAD or a mobile phone, and selects to view a video. Before playing back the video or during playing back the video, the video application requests an application SDK, obtains related data of an advertisement, and starts to play back the advertisement. A control policy is that if the advertisement is a form type advertisement, a WebView page will be loaded. The WebView page creates a form control and an interaction method according to a customized parameter (including a type and a quantity of the form control required by the form) of the user.

Specific implementation processes may include the following.

Figure 15:
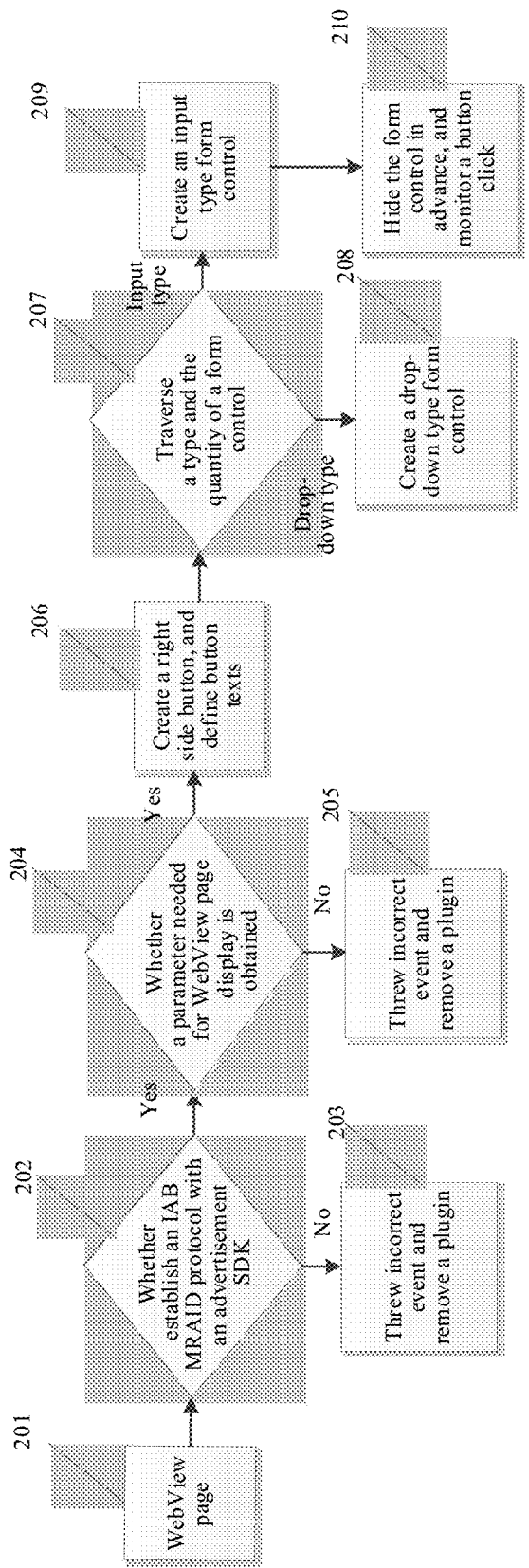
FIG. 15 is schematic flowchart 3 of a media information processing method in an embodiment of the present disclosure.

Referring to FIG. 15, after the WebView page is loaded (Step S201), first, it is determined, according to an MRAID protocol developed by an IAB, whether the network page has already established an interaction protocol with the advertisement SDK (Step S202), and if the establishment fails, incorrect information is discarded, and the advertisement cannot be presented (Step S203). If the protocol is established successfully, which indicates that the WebView page can perform data interaction with a native App by using this protocol, the required customized parameter (including the type and the quantity of the form control required by the form) can be obtained from the advertisement SDK (Step S204), and be parsed to determine whether a problem exists in the parameter. After the required parameter is parsed and no problem exists, the right side button can be created and custom texts can be presented (step 206) according to the parameter, and then the corresponding input type form control (step S207) and drop-down type form control (step S208, step S209) are created by traversing the type and the quantity of the form control in the parameter. If a problem is found during parsing, the incorrect information is discarded, and the advertisement cannot be presented (step S205). After the form controls are created, first, a control graphical interface (UI) is hidden. When the user clicking the right side button is monitored, the form controls to be used present corresponding form items to interact with the user.

Figure 16:
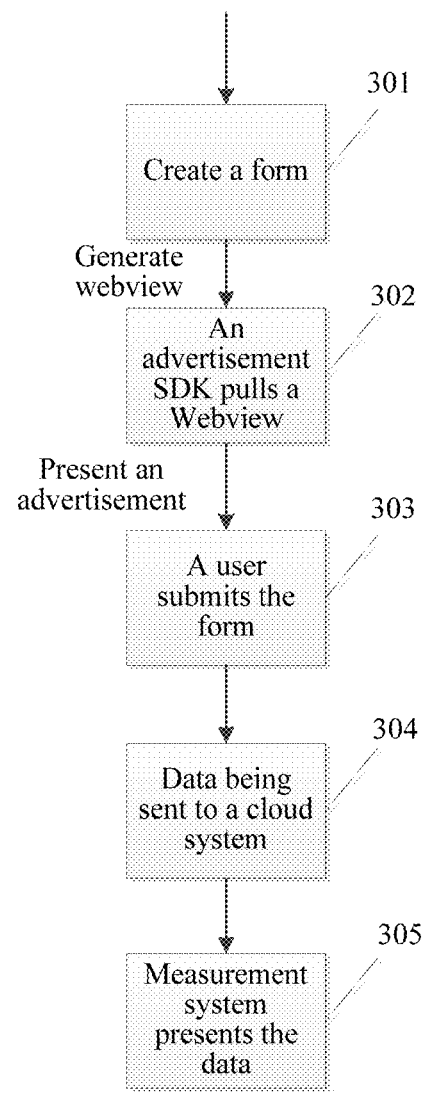
FIG. 16 is schematic flowchart 4 of a media information processing method in an embodiment of the present disclosure.

Refer to FIG. 16 for form creation to data presentation. The whole implementation may be divided into the following steps.

Step S301: An advertiser may submit a form in a server to generate a WebView page.

Step S302: During a push period of an advertisement, an advertisement SDK may load the WebView page, and presents a bootstrap action prompt on the advertisement.

Step S303: A user can click the bootstrap action prompt on the advertisement, and participates in filling in a form.

Step S304: A cloud-based system verifies user data and saves the user data to the cloud-based system.

Step S305: An measurement system provides presentation and download of the user data.

The measurement system and the cloud-based system are carriers of different functions at a server.

In embodiments of the present disclosure, template customization may be easily implemented by using an existing WebView template developing system of an Order system. A current form is a set of template, AND the set of template can be achieved by configuration, which is very convenient. The advertiser may set the customized parameter by simple text input and drop-down box selection, to generate the WebView page. Each advertisement order may correspond to one WebView page, and is stored on a CDN. The advertisement SDK only needs to load the WebView page related to the advertisement to achieve an automatic form. If the form needs to be further designed or added with more options, only the customized parameter in the Order system needs to be modified, which is very CONVENIENT.

In embodiments of the present disclosure, the form data submitted by the user may be accessed by the cloud-based system. The cloud-based system can not only support data collection, but also provide functions such as data verification, and times limit of user submission, to ensure security and authenticity of the data. The user can view and download the data in real time by using the Measurement system after submitting the form.

In embodiments of the present disclosure, when the user watches a video roll, information submission can be performed. When the roll is played back, a floating layer prompts the user to fill in more information and obtain an award/apply for test driving. After the user clicks the floating layer, a suspension floating layer is popped out above the roll for the user to input information. Form filling-in content and roll content are closely linked, which can improve participation enthusiasm of the user and accuracy of the data. A unique icon format is used for presentation, which facilitates presentation of the mobile and understanding of the user, and greatly differs from a text box, an input box, and a drop-down box at the PC side.

In embodiments of the present disclosure, additional page development may not be needed, and all the form items may be fixed at the server side background for the advertiser to select and generate the customized parameter. That the additional page development is not needed means saving time and energy, one-click selection, one-click submission, and immediate presentation. Selection of the advertiser is simpler: information needs not to be submitted additionally, manpower is not needed, and only the form items needing to be presented need to be selected. Filling-in items are all fixed at the background, and can be expanded means that all the filling-in items are fixed at the background, and can be updated and added at any time, to implement quick iterations.

In embodiments of the present disclosure, the advertiser may upload a custom item needed by the advertiser at the background. After being selected to upload, the custom item can be presented at a foreground. If the items fixed at the background are not enough, the advertiser can define and add an item, such as store information and other information with a personalized requirement, and support can be instantly completed.

In embodiments of the present disclosure, real-time transmission and viewing of data may be implemented in one step. The form data submitted by the user accesses the cloud system. The cloud-based system can not only support data collection, but also provide functions such as data verification, and times limit of user submission, to ensure security and authenticity of the data. The user can view and download the data in real time by using the Measurement system after submitting the form.

Figure 17:
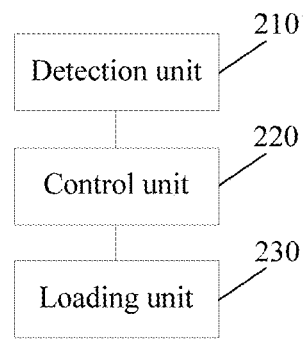
FIG. 17 is a schematic structural diagram of a mobile terminal in an embodiment of the present disclosure.

The embodiments of the present disclosure record a mobile terminal that can be used to implement the media information processing method recorded by the foregoing embodiments. Referring to FIG. 17, a detection unit 210 is configured to: detect that a condition for presenting media information in a graphical interface of an application is satisfied, and request media information and a control policy of the media information from a server. A control unit 220 is configured to: load the control policy in the application, execute the control policy to determine that a form needs to be used in the media information to obtain information from a user of a mobile terminal 200, and request a WebView page adapted to the form from the server side, the WebView page being obtained by the server side by initializing a WebView template based on a customized parameter of the form. A loading unit 230 is configured to: execute the control policy to present the media information in the graphical interface of the application, and load the WebView page in the graphical interface of the application, the WebView page at least including a form control corresponding to a form item of the form. A unit may refer to one or more computer program instructions stored in computer readable medium, when executed by one or more processors, the computer program instructions may implement the method and functionality described in relation to the specific unit.

To avoid disturbance to the user viewing the media information due to presenting the form in the graphical interface of the application, the loading unit 230 may present the bootstrap action identifier that is in the WebView page, hides the bootstrap action identifier in response to a trigger operation for the bootstrap action identifier, and invokes, in the graphical interface of the application, the form tool to present a corresponding form item.

To avoid wrong form information input by the user, the loading unit 230 may obtain form information input in response to an input operation for the form item presented by the form control, and performs verification processing on the form information; and invokes, in response to a submission operation for the form information, a data interface to load the form information that has been verified to the server side.

The loading unit 230 may be further configured to: load a floating layer in the graphical interface of the application by using a preset display parameter; and loads, in the floating layer, a preset quantity of the form controls.

To prompt the user of the operation status for the form items, the loading unit 230 may parse an operation for the form item, and determines a target form item of the operation and an operation status of the target form item; and updates an icon display effect of the target form item based on the operation status of the target form item, the operation status comprising at least one of the following: a no operation state, an input state, an input complete state, or an input error state.

To achieve fluent viewing experience before and after filling in the form in a process of the user viewing media information, the loading unit 230 may stop, in response to an operation for the bootstrap action identifier, presenting the media information in the graphical interface of the application; and resume, in response to the submission operation for the form information, presenting the media information.

The loading unit 230 may be further configured to: present the media information in a first area of the graphical interface of the application, and load the WebView page in a second area of the graphical interface of the application, the second area being a sub-area of the first area, or the first area and the second area being different areas of the graphical interface of the application.

The function units described above may be implemented by a processor in the mobile terminal by executing an executable instruction stored in a memory.

Figure 18:
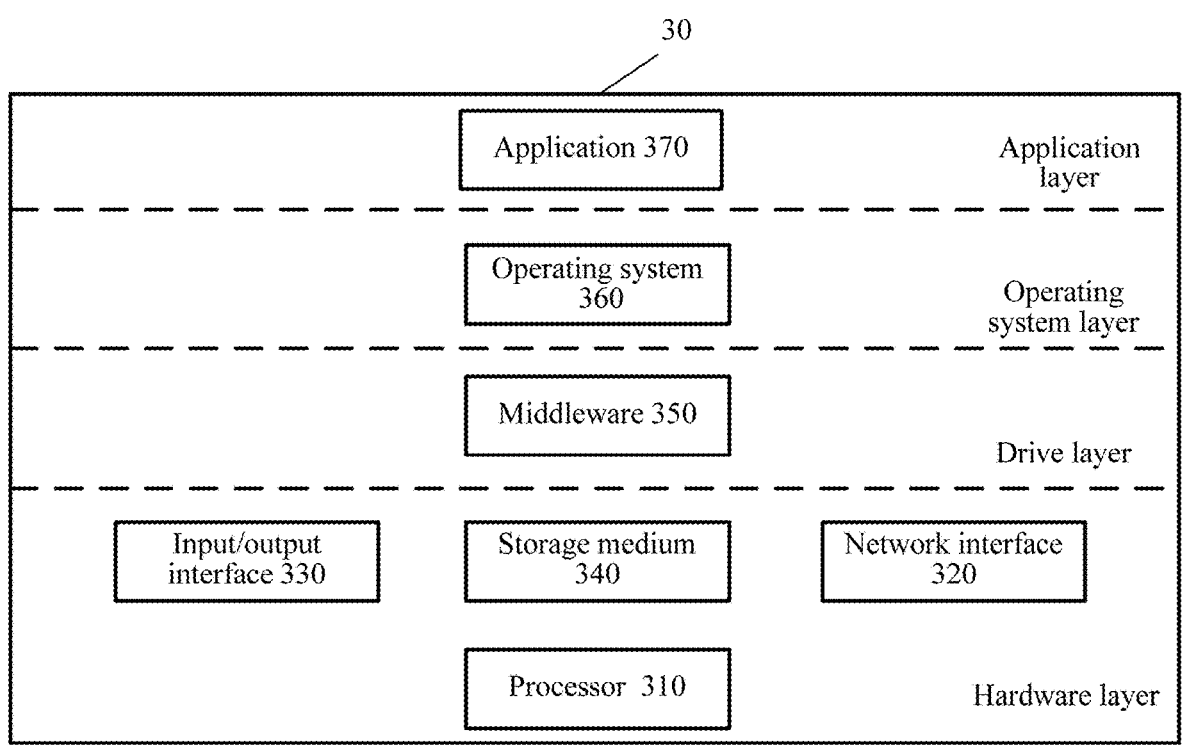
FIG. 18 is a schematic structural diagram of optional software and hardware of a mobile terminal 30 in an embodiment of the present disclosure.

Refer to FIG. 18, FIG. 18 shows a schematic structural diagram of optional software and hardware of a mobile terminal 30. The mobile terminal includes a hardware layer, an intermediate layer, an operating system layer, and a software layer. However, a person skilled in the art should understand that the structure of the mobile terminal shown in FIG. 18 is merely an example, and does not constitute a limitation to the mobile terminal. For example, the mobile terminal may set more components than in FIG. 18 according to implementation needs, or omit setting some components according to the implementation needs.

The hardware layer of the mobile terminal includes a processor 310, an input/output interface 330, storage medium 340, and a network interface 320. The components may be connected to and communicate with each other by using a system bus.

The processor 310 may be implemented by using a central processing unit (CPU), a microcontroller unit (MCU), an application specific Integrated circuit (ASIC), or a field-programmable gate array (FPGA).

The input/output interface 330 may be implemented by using an input/output device, such as a display screen, a touch screen, or a speaker.

The storage medium 340 may be implemented by using a non-volatile storage medium such as a flash memory, a hard disk, or an optical disc, or may be implemented by using a volatile storage medium such as a double data rate (DDR) dynamic cache. The storage medium 340 stores an executable instruction used to perform the foregoing interface display method.

In embodiments of the present disclosure, the storage medium 340 may be set together with other components of the mobile terminal, or may be separately disposed relative to the other components of the mobile terminal. The network interface 320 provides the processor 310 with external data, such as an access capability of the remotely set storage medium 340. Exemplarily, the network interface 320 may achieve near field communications based on a near field communication (NFC) technology, a Bluetooth technology, and a ZigBee technology, and may also achieve cellular communications based on a communications standard such as a CDMA, a WCDMA, and an evolution standard thereof. For another example, the network interface 320 may achieve communications accessing a network side by accessing an AP based on a WIFI method.

A drive layer may include middleware 15 used by an operating system 360 to recognize hardware layer and communicate with components of the hardware layer. For example, the middleware 15 may be a set of drivers for the components of the hardware layer.

The operating system 360 may be used to provide a user-oriented graphical interface, and exemplarily, includes a plugin icon, a desktop background, and an application icon. The operating system 360 supports the user to control a device by using the graphical interface. A software environment, such as an operating system type, or version of the foregoing device is not limited in the embodiments of the present disclosure, and for example, may be a Linux operating system, a UNIX operating system, or other operating systems.

An application layer may include a client run by a user mobile terminal, for example, an application 370 that provides a network service, for example, a video client application described above.

In embodiments of the present disclosure, a WebView page may be initialized by using a customized parameter set by a media information provider for form items, to obtain a WebView page adapted to media information pushed by the media information provider. When the media information is presented in a mobile terminal, the WebView page may be loaded in a graphical interface by using a control policy in an application, to achieve a technical effect of presenting a form in a media information presentation interface of the mobile terminal and performing interaction. By using the WebView page to present the form and support the interaction, the application of the mobile terminal only needs to have a capability of loading the WebView page, and needs not to adapt to various technical interfaces in the mobile terminal, thereby improving the developing efficiency. In addition, the WebView pages can be generated in advance according to the customized parameters set by different media information providers for the form items, thereby ensuring efficiency of pushing the media information to the mobile terminal and obtaining information from the user of the mobile terminal.

A Person skilled in the art should understand that all or part of steps of the method according to the embodiments may be implemented by a program instructing relevant hardware. The program may be stored in a computer readable storage medium. When the program is executed, the steps of the method according to the embodiments are performed. The storage medium may be any medium that is capable of storing program codes, such as a random access memory (RAM), a read-only memory (ROM), a magnetic disk, or an optical disk.

Alternatively, if implemented in the form of software functional modules and sold or used as an independent product, the integrated modules of the present disclosure may also be stored in a computer-readable storage medium. Based on such an understanding, the technical solutions of the embodiments of the present disclosure essentially, or the part contributing to the prior art may be implemented in a form of a software product. The software product is stored in a storage medium, and includes several instructions for instructing a computer device (which may be a personal computer, a server, or a network device) to perform all or a part of the methods described in the embodiments of the present disclosure. The foregoing storage medium includes: any medium that can store program codes, such as a portable storage device, a RAM, a ROM, a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A media information processing method applied to a mobile terminal, comprising:
   determining that a condition for presenting media information in a graphical interface of an application executed on the mobile terminal is satisfied;
   requesting media information and a control policy of the media information from a server;
   loading the control policy in the application, and determining that a form needs to be used in the media information to obtain information from a user;
   requesting a WebView page adapted to the form from the server, the WebView page being obtained by initializing a WebView template based on a customized parameter of the form;
   presenting the media information in the graphical interface of the application, and loading the WebView page in the graphical interface of the application;
   in response to a first user input in the graphical interface of the application, stopping presenting the media information and invoking a form control in the WebView page to present a corresponding preset quantity of form items in the graphical interface of the application, wherein each of the preset quantity of form items corresponds to a plurality of icons, each icon indicating a state of a form item, and the form item is initially presented at a no-operation state using a first icon including a first icon image;
   in response to the form item being selected, presenting the form item at an input state by replacing the first icon with a second icon, and obtaining form input information based on a second user input operation directed to the form item, the second icon being a combination of a second icon image and a default text;
   replacing the default text with an inputted text generated based on the obtained form input information;
   in response to the second user input operation being completed, verifying the form input information and, presenting the form item at an input complete state using a third icon or presenting the form item at an input error state using a fourth icon, wherein the inputted text is included in the third icon and the fourth icon;
   invoking, in response to a user submission operation for the form input information, a data interface to upload the form input information that has been verified to the server; and
   resuming, in response to the user submission operation being complete, presenting the media information in the graphical interface of the application.

2. The method according to claim 1, wherein
   the WebView page is loaded with a bootstrap action identifier, and the form control corresponding to the form item of the form;
   the bootstrap action identifier is obtained by initializing bootstrap action description information indicated by the customized parameter; and
   the form control is created based on one or more of: a type and a quantity of the form control required by the form that is indicated by the customized parameter, and a type and a quantity of the form item in the form that is indicated by the customized parameter.

3. The method according to claim 1, further comprising:
   presenting a bootstrap action identifier in the WebView page along with the media information;
   in response to a trigger operation for the bootstrap action identifier, hiding the bootstrap action identifier and performing the invoking of the form control to present the corresponding preset quantity of form item in the graphical interface of the application.

4. The method according to claim 1, wherein the presenting the form item in the graphical interface of the application comprises:
   loading a floating layer in the graphical interface of the application by using a preset display parameter; and
   presenting, in the floating layer the preset quantity of corresponding form item.

5. The method according to claim 3, wherein in response to the first user input in the graphical interface of the application, stopping presenting the media information comprises further comprising:
   stopping, in response to the trigger operation for the bootstrap action identifier, presenting the media information in the graphical interface of the application; and
   resuming, in response to the submission operation for the form information, presenting the media information.

6. The method according to claim 1, further comprises:
   presenting the media information in a first area of the graphical interface of the application, and
   loading the WebView page in a second area of the graphical interface of the application.

7. The method according to claim 6, wherein the second area being a sub-area of the first area.

8. The method according to claim 6, wherein the first area and the second area being different areas of the graphical interface of the application.

9. The method according to claim 1, wherein requesting the media information and the control policy of the media information comprises:

sending, to the server, characteristic information of at least one of the mobile terminal and a user of the mobile terminal,
wherein the media information and the control policy returned from the server are determined based on the characteristic information.

10. The method according to claim 9, wherein:
the characteristic information of the mobile terminal includes at least one of: an operating system type, a networking method, a type of an operator of a used communications service, a networking scenario, or an application behavior; and
the characteristic information of the user of the mobile terminal includes at least one of: a region, a gender, an age group, an education degree, or an interest and preference.

11. The method according to claim 3, wherein:
the customized parameter of the form includes a text associated with the bootstrap action identifier, a type of the form control indicating a manner of requesting the form input information, and the default text; and
the customized parameter of the form is preconfigured by a provider of the media information and stored on the server.

12. A mobile terminal, comprising:
a memory; and
a processor coupled to the memory and configured to:
detect that a condition for presenting media information in a graphical interface of an application executed on the mobile terminal is satisfied;
request media information and a control policy of the media information from a server;
load the control policy in the application, and determine, by executing the control policy, that a form needs to be used in the media information to obtain information from a user of the mobile terminal;
request a WebView page adapted to the form from a server, the WebView page being obtained by initializing a WebView template based on a customized parameter of the form;
present the media information in the graphical interface of the application, and load the WebView page in the graphical interface of the application;
in response to a first user input in the graphical interface of the application, stop presenting the media information and invoke a form control in the WebView page to present a corresponding preset quantity of form items in the graphical interface of the application, wherein each of the preset quantity of form items corresponds to a plurality of icons, each icon indicating a state of a form item, and the form item is initially presented at a no-operation state using a first icon including a first icon image;
in response to the form item being selected, present the form item at an input state by replacing the first icon with a second icon, and obtain form input information based on a second user input operation directed to the form item, the second icon being a combination of a second icon image and a default text;
replace the default text with an inputted text generated based on the obtained form input information;
in response to the second user input operation being completed, verify the form input information and, present the form item at an input complete state using a third icon or present the form item at an input error state using a fourth icon, wherein the inputted text is included in the third icon and the fourth icon;
invoke, in response to a submission operation for the form input information, a data interface to upload the form input information that has been verified to the server; and
resume, in response to the user submission operation being complete, presenting the media information in the graphical interface of the application.

13. The mobile terminal according to claim 12, wherein processor is further configured to: present the bootstrap action identifier that is in the WebView page, hide the bootstrap action identifier in response to a trigger operation for the bootstrap action identifier, and invoke the form tool to present a corresponding form item; and
the loading unit is further configured to: obtain form input information in response to the second user input operation for the form item presented by the form control, and perform verification processing on the form input information; and to invoke, in response to a submission operation for the form information, a data interface to load the form input information that has been verified to the server.

14. The mobile terminal according to claim 13, wherein the loading unit processor is further configured to: load a floating layer in the graphical interface of the application by using a preset display parameter; and invoke, in the floating layer, a preset quantity of the form controls to present the corresponding preset quantity of form items.

15. The mobile terminal according to claim 13, wherein the loading unit processor is further configured to: stop, in response to an operation for the bootstrap action identifier, presenting the media information in the graphical interface of the application; and resume, in response to the submission operation for the form information, presenting the media information.

16. The mobile terminal according to claim 13, wherein the loading unit processor is further configured to: present the media information in a first area of the graphical interface of the application, and load the WebView page in a second area of the graphical interface of the application, the second area being a sub-area of the first area.

17. A non-transitory computer storage medium, the storage medium storing an executable instruction, and the executable instruction being used to perform the media information processing method comprising:
determining that a condition for presenting media information in a graphical interface of an application executed on a mobile terminal is satisfied;
requesting media information and a control policy of the media information from a server;
loading the control policy in the application, and determining that a form needs to be used in the media information to obtain information from a user;
requesting a WebView page adapted to the form from the server, the WebView page being obtained by initializing a WebView template based on a customized parameter of the form;
presenting the media information in the graphical interface of the application, and loading the WebView page in the graphical interface of the application;
in response to a first user input in the graphical interface of the application, stopping presenting the media information and invoking a form control in the WebView page to present a corresponding preset quantity of form items in the graphical interface of the application, wherein each of the preset quantity of form items corresponds to a plurality of icons, each icon indicating a state of a form item, and the form item is initially presented at a no-operation state using a first icon including a first icon image;

in response to the form item being selected, presenting the form item at an input state by replacing the first icon with a second icon, and obtaining form input information based on a second user input operation directed to the form item, the second icon being a combination of a second icon image and a default text;

replacing the default text with an inputted text generated based on the obtained form input information;

in response to the second user input operation being completed, verifying the form input information and, presenting the form item at an input complete state using a third icon or presenting the form item at an input error state using a fourth icon, wherein the inputted text is included in the third icon and the fourth icon;

invoking, in response to a user submission operation for the form input information, a data interface to upload the form input information that has been verified to the server; and resuming, in response to the user submission operation being complete, presenting the media information in the graphical interface of the application.

18. The computer storage medium according to claim 17, wherein the WebView page is loaded with a bootstrap action identifier, and the form control corresponding to the form item of the form, the bootstrap action identifier is obtained by initializing bootstrap action description information indicated by the customized parameter; and the form control is created based on one or more of: a type and a quantity of the form control required by the form that is indicated by the customized parameter, and a type and a quantity of the form item in the form that is indicated by the customized parameter.

19. The computer storage medium according to claim 17, the media information processing method further comprises:

presenting a bootstrap action identifier in the WebView page along with the media information;

in response to a trigger operation for the bootstrap action identifier, hiding the bootstrap action identifier and performing the invoking of the form control to present the corresponding preset quantity of form item in the graphical interface of the application.

20. The computer storage medium according to claim 19, wherein the presenting the form item in the graphical interface of the application comprises:

loading a floating layer in the graphical interface of the application by using a preset display parameter; and presenting, in the floating layer the corresponding preset quantity of form item.

\* \* \* \* \*